(12) United States Patent
Winterhalter et al.

(10) Patent No.: US 8,727,191 B2
(45) Date of Patent: May 20, 2014

(54) CHILD STROLLER APPARATUS HAVING A TRAY MOUNTED WITH A CUP HOLDER

(75) Inventors: Andrew J. Winterhalter, West Lawn, PA (US); Robert E. Haut, West Chester, PA (US); Joseph F. Fiore, Jr., Lebanon, PA (US); Curtis M. Hartenstine, Birdsboro, PA (US); Linhai Shan, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 231 days.

(21) Appl. No.: 13/274,449

(22) Filed: Oct. 17, 2011

(65) Prior Publication Data

US 2012/0097721 A1    Apr. 26, 2012

Related U.S. Application Data

(60) Provisional application No. 61/455,565, filed on Oct. 21, 2010, provisional application No. 61/459,560, filed on Dec. 15, 2010.

(51) Int. Cl.
*B62B 9/12* (2006.01)

(52) U.S. Cl.
USPC ............................ 224/409; 224/553; 224/926

(58) Field of Classification Search
USPC ......... 224/409, 926, 483, 545, 547, 548, 549, 224/553, 555, 556, 557; 410/107, 111
See application file for complete search history.

(56) References Cited

U.S. PATENT DOCUMENTS

| | | | | |
|---|---|---|---|---|
| 4,852,499 A | * | 8/1989 | Ozols | 108/44 |
| 4,955,571 A | * | 9/1990 | Lorence et al. | 248/311.2 |
| 5,860,630 A | * | 1/1999 | Wildey et al. | 248/311.2 |
| 7,011,363 B1 | * | 3/2006 | Connery | 297/153 |
| 7,360,747 B2 | * | 4/2008 | Stephan et al. | 248/311.2 |
| 2002/0005628 A1 | * | 1/2002 | Hartenstine et al. | 280/647 |
| 2004/0200941 A1 | * | 10/2004 | Dennis et al. | 248/311.2 |

FOREIGN PATENT DOCUMENTS

| CN | 2406565 Y | 11/2000 |
|---|---|---|
| CN | 1448095 A | 10/2003 |

* cited by examiner

*Primary Examiner* — Adam Waggenspack
(74) *Attorney, Agent, or Firm* — David I. Roche; Baker & McKenzie LLP

(57) ABSTRACT

A stroller apparatus can comprise a handle having two side segments, a tray assembled between the two side segments, and a cup holder movably mounted with the tray. The cup holder is adjustable between a first position retracted close to the tray to limit access to the cup holder, and a second position deployed away from the tray to facilitate access to the cup holder.

7 Claims, 9 Drawing Sheets

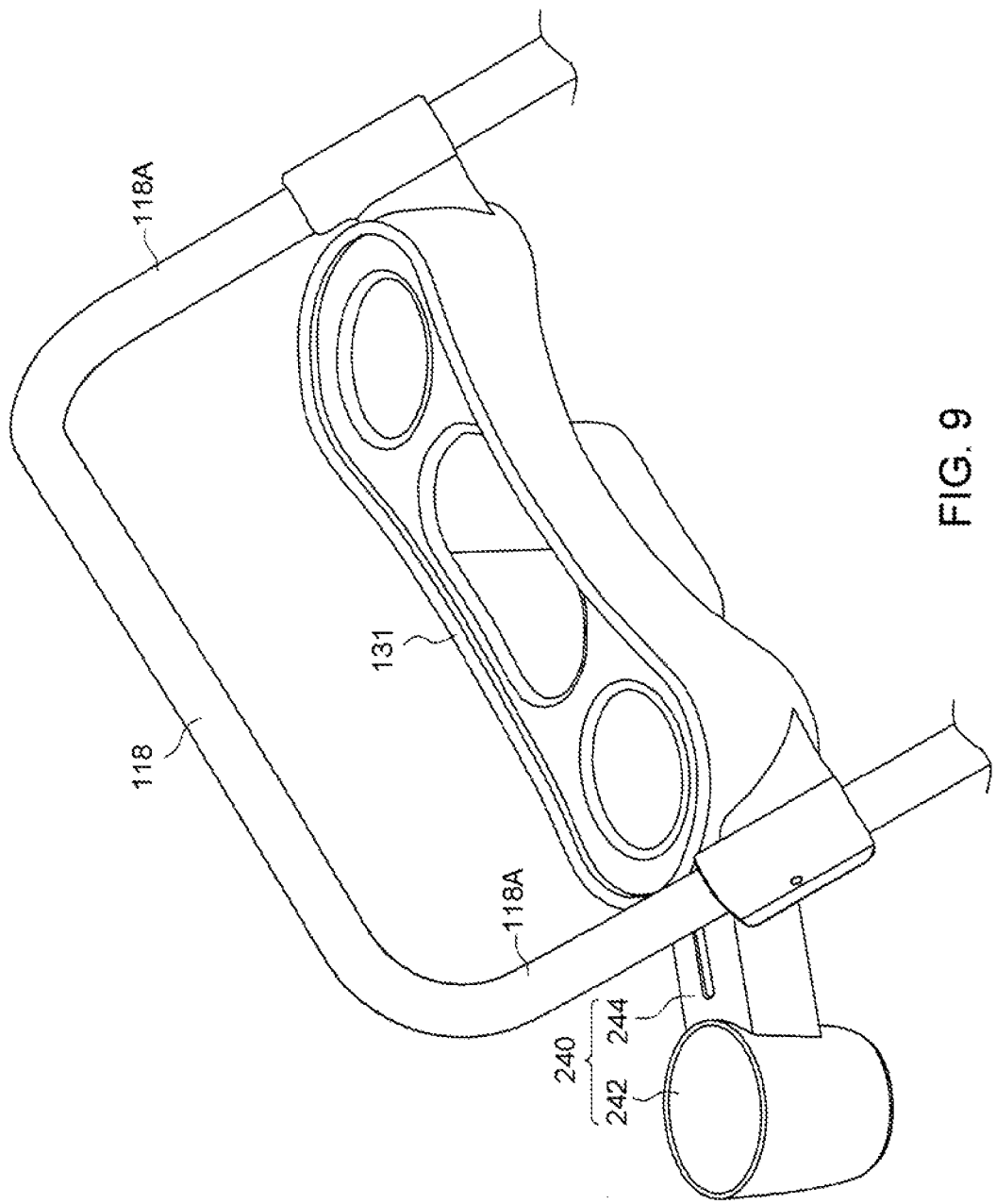

CHILD STROLLER APPARATUS HAVING A TRAY MOUNTED WITH A CUP HOLDER

CROSS-REFERENCE TO RELATED APPLICATION

This application claims priority to U.S. Provisional Patent Application No. 61/455,565 filed on Oct. 21, 2010, and U.S. Provisional Patent Application No. 61/459,560 filed on Dec. 15, 2010.

BACKGROUND OF THE INVENTION

1. Field of the Invention

The present invention relates to stroller apparatuses that have a tray mounted with a cup holder.

2. Description of the Related Art

A current trend is to provide a stroller apparatus that can receive a child close to the caregiver. To this end, some approaches propose a stroller apparatus in which the child can be seated facing rearward at an elevated position to facilitate interaction with the caregiver. However, the elevated placement of the child's seat may interfere with the position of a tray that is usually affixed with the handle and allows the caregiver to place various objects such as mobile phones, keys, toys and the like. The tray may have a cup holder to carry water bottles, drink cans, hot coffee and the like. Owing to the high position of the child's seat, the child may accidentally bump the head against the cup holder. The conventional position of the cup holder may also render inconvenient the placement or removal of the child from the stroller. Moreover, because the cup holder is relatively close to the child seat, the drink supported by the cup holder may spill onto the child, which may raise safety concerns, especially when a hot liquid is involved. In addition to safety concerns, the cup holder may also render the collapse of the stroller inconvenient to operate.

Therefore, there is a need for a stroller apparatus that can be safer in use and address at least the foregoing issues.

SUMMARY

The present application describes a stroller apparatus that has a tray mounted with a cup holder. In one embodiment, the stroller apparatus can comprise a handle having two side segments, a tray assembled between the two side segments, and a cup holder movably mounted with the tray, the cup holder being adjustable between a first position retracted close to the tray and a second position deployed away from the tray.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

BRIEF DESCRIPTION OF THE DRAWINGS

FIG. 9 is a perspective view illustrating the cup holder shown in FIG. 8 from an upper side.

DETAILED DESCRIPTION OF THE EMBODIMENTS

Figure 1:
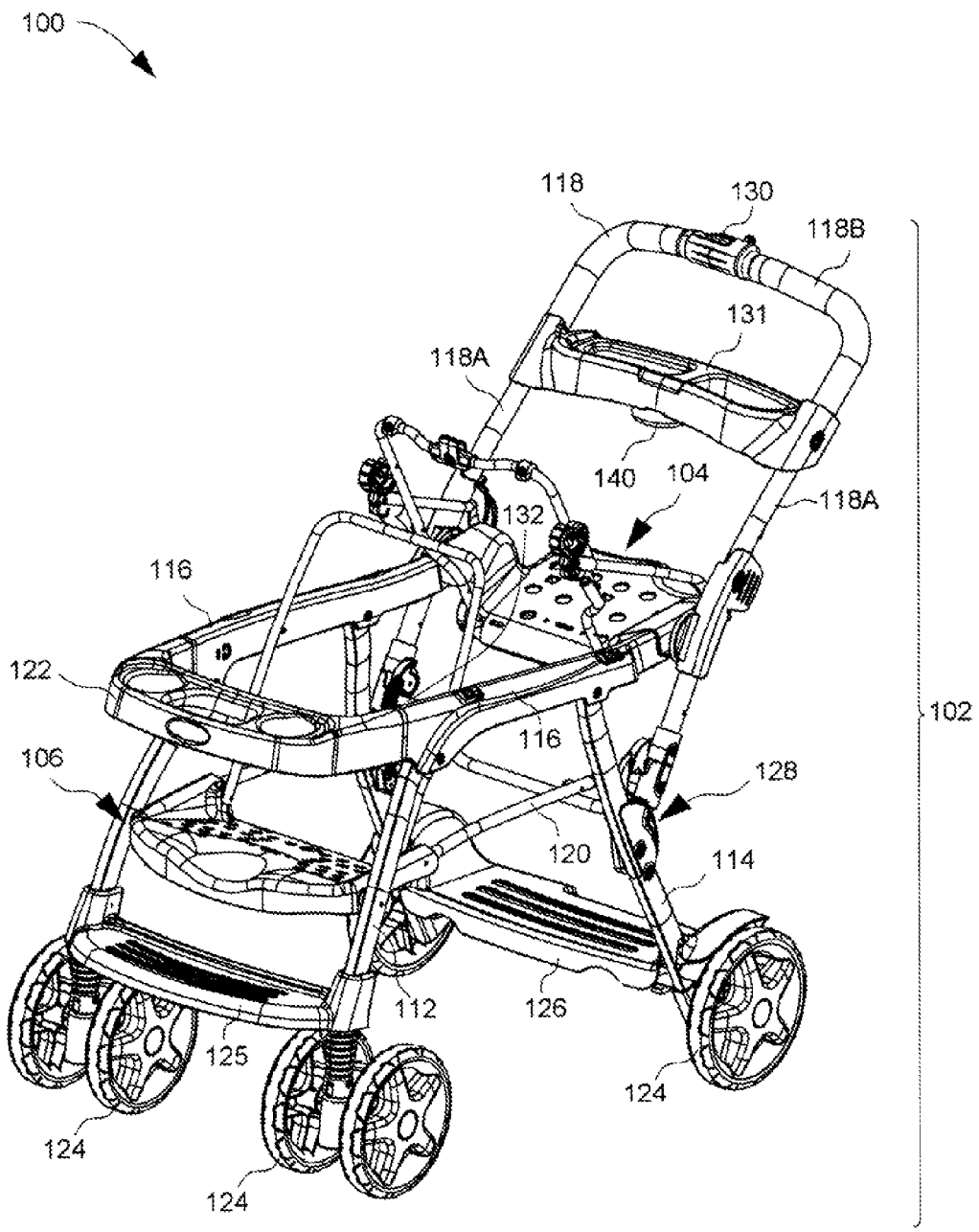
FIG. 1 is a schematic view illustrating one embodiment of a stroller apparatus.

FIG. 1 is a schematic view illustrating one embodiment of a stroller apparatus 100. The stroller apparatus 100 can include a support frame 102, and a plurality of seats adapted to receive one or more child in different positions. The seats can include a first seat 104 adapted to receive a child in a first position facing rearward, a second seat 106 adapted to receive a child in a second position facing forward in front of the first seat 104. In some embodiments, the stroller apparatus 100 can be used as a tandem stroller that accommodates two children. A first child may be placed on the second seat 106 facing forward. A second child may be placed on the first seat 104 facing rearward behind the first child.

The support frame 102 can have left and right sides symmetric in construction, including front legs 112, rear legs 114, side handrails 116, a handle 118 and a seat support frame 120. At each of the left and right sides of the support frame 102, the side handrail 116 extends from a front to a rear of the stroller apparatus 100. Front ends of the side handrails 116 can be connected with two sides of a front table 122 that is placed along a transverse direction in front of the second seat 106. The front leg 112 can have an upper end pivotally connected with a front portion of the associated side handrail 116, and the rear leg 114 can have an upper end pivotally connected with a rear portion of the associated side handrail 116. Lower ends of the front and rear legs 112 and 114 can be mounted with wheels 124 for displacement of the stroller apparatus 100.

In some embodiments, a footrest 125 can be connected between the front legs 112 at a position below the second seat 106. In addition, a stand platform 126 can be assembled between the rear legs 114 in an area between the rear wheels 124. When a child is installed on the second seat 106, the footrest 125 can provide support for the child's feet. The stand platform 126 can be used as support for a child standing up at the rear of the support frame 102. While standing on the stand platform 126, the child can grasp the side handrails 116, and the first seat 104 can be removed at the same time.

The handle 118 can have a generally U-shape including left and right side segments 118A, and a transverse segment 118B connected between the side segments 118A. Each of the side segments 118A can be pivotally connected with a rear portion of the associated side handrail 116. In some embodiments, a shaft portion (not shown) can be passed through a hole formed through the rear portion of the side handrail 116 to form the pivotal connection between each side segment 118A of the handle 118 and the side handrail 116. Each of the side segments 118A can also have a distal end pivotally connected with the rear leg 114 via a joint structure 128. In some embodiments, each of the joint structures 128 can include a latch mechanism (not shown) that may be operatively connected with an actuator 130 provided on the transverse segment 118B of the handle 118. With this construction, the handle 118 can be operable to rotate relative to the rear legs 114 and the side handrails 116 when the stroller apparatus 100 is collapsed or deployed.

In some embodiments, the seat support frame 120 can be placed below the side handrail 116 and include two elongated side bars extending from a front to a rear of the support frame 102. Each of the side bars can have a front end pivotally connected with one front leg 112, and a rear end pivotally connected with one side segment 118A of the handle 118 via a coupling link 132. The seat support frame 120 can be used to mount the second seat 106.

For convenient placement of diverse objects, a tray 131 may be affixed between the side segments 118A at a height above the first seat 104. In some embodiments, the tray 131 can be formed integrally by plastic injection molding. The tray 131 may be either permanently affixed with the handle 118, or removably assembled with the handle 118 according to the caregiver's needs. The tray 131 can be movably mounted with a cup holder 140 that can carry diverse objects such as a water bottle, drink can and like liquid containers. The cup holder 140 can be operable to move between a first position retracted close to the tray 131 where access to the cup holder 140 may be limited, and a second position deployed away from the tray 131 allowing and facilitating total access to the cup holder 140.

Figure 2:
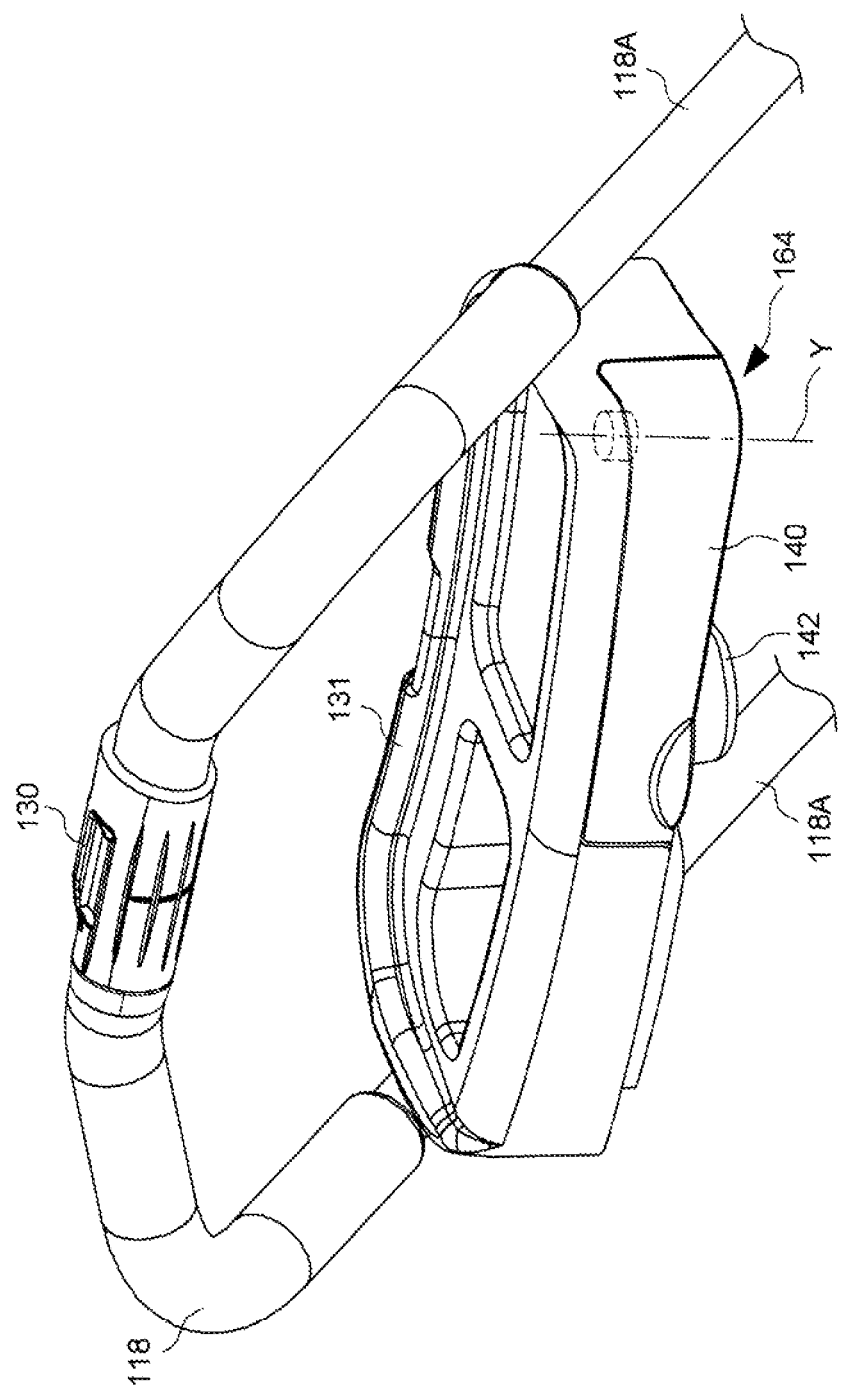
FIG. 2 is an enlarged view illustrating the assembly of a cup holder with a tray in the stroller apparatus shown in FIG. 1.
Figure 3:
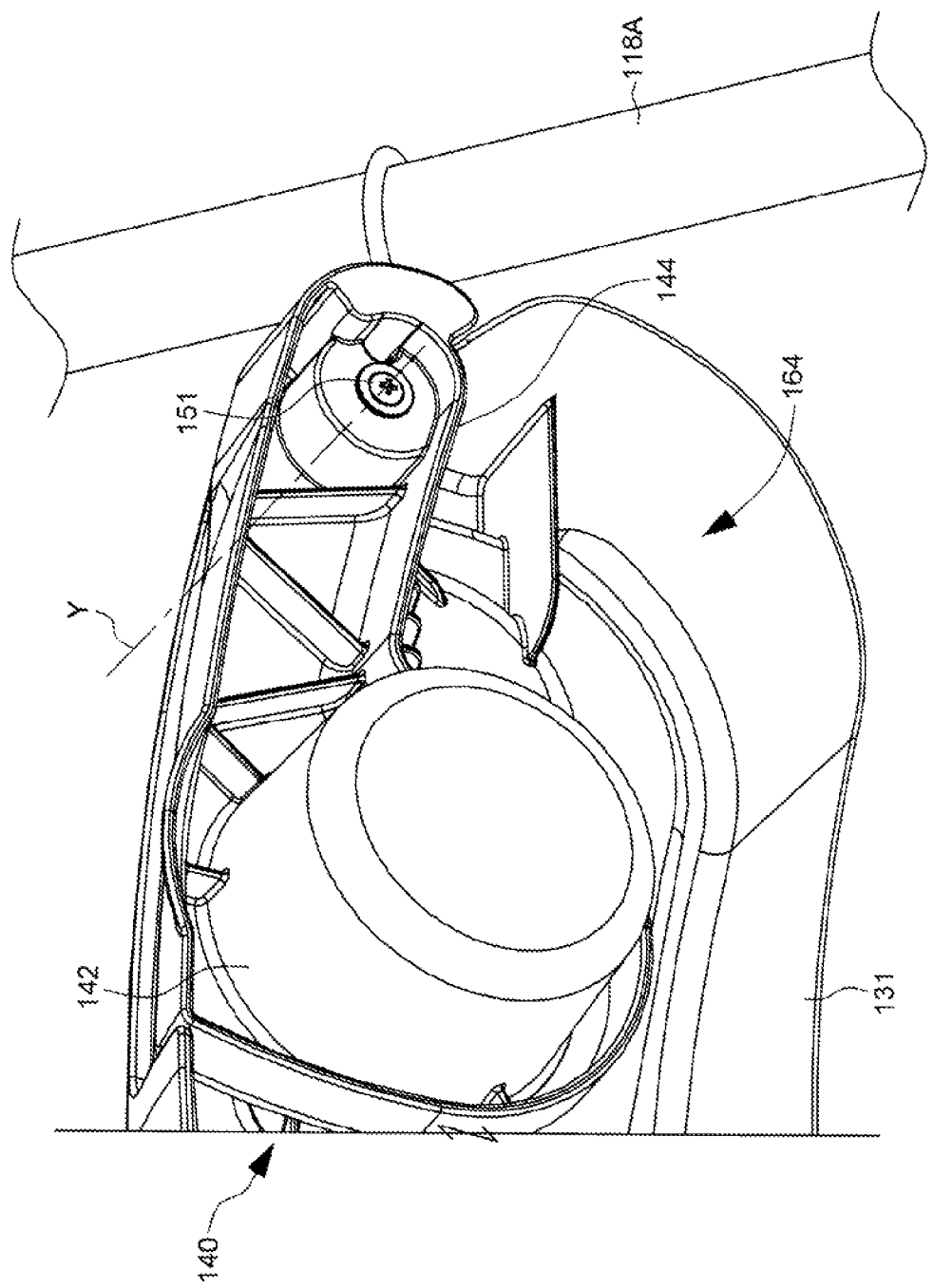
FIG. 3 is a bottom view illustrating the assembly of the cup holder with the tray.
Figure 4:
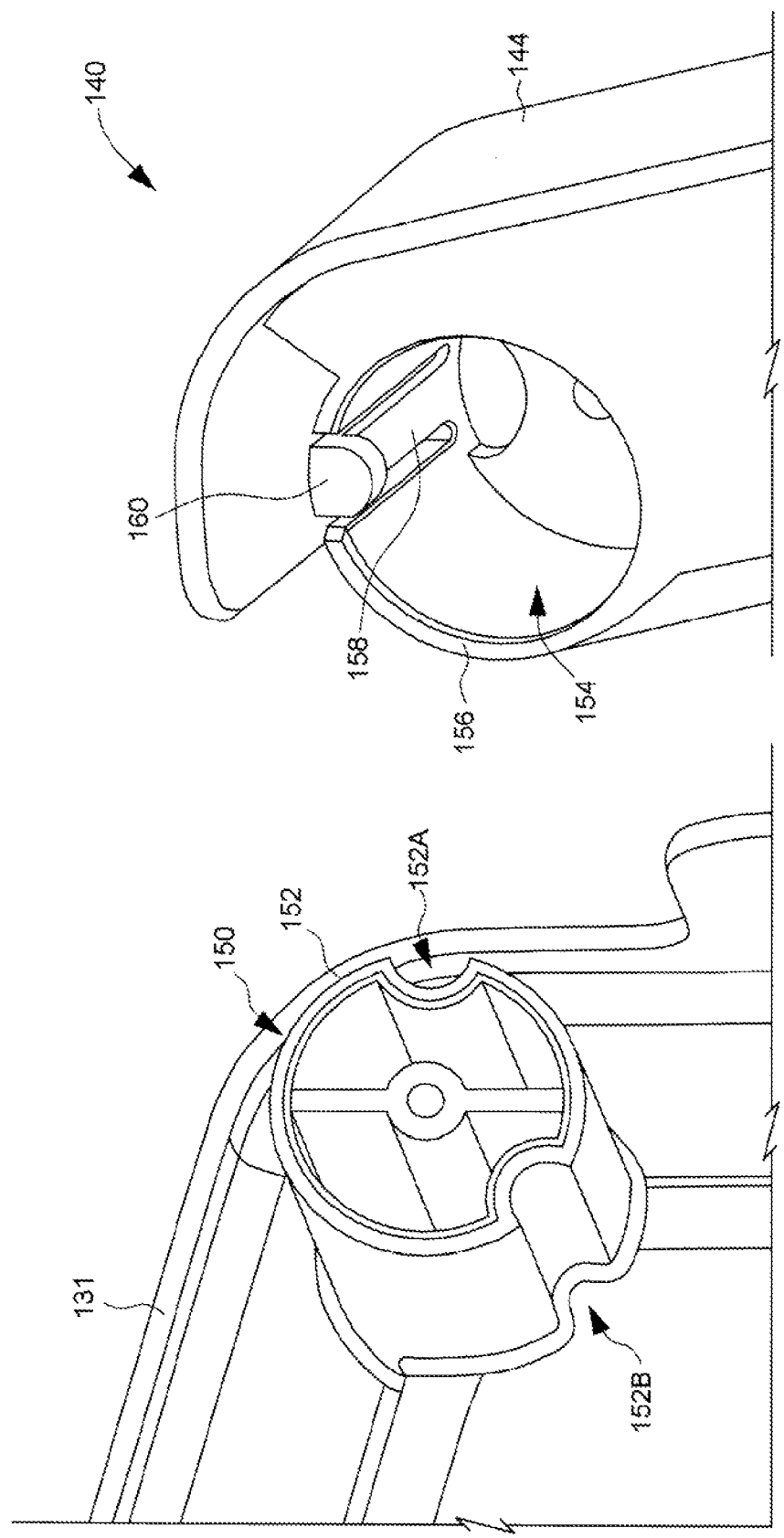
FIG. 4 is an exploded view illustrating the assembly of the cup holder with the tray.

FIGS. 2-4 are respectively enlarged, bottom and exploded views illustrating the assembly of the cup holder 140 with the tray 131. The cup holder 140 can include a holder portion 142, and an arm 144 joined with the holder portion 142 and movably assembled with the tray 131. The cup holder 140, including the holder portion 142 and the arm 144, may be formed integral by plastic injection molding. The holder portion 142 can be formed with a cup-like pocket sized to receive a drink container.

An underside of the tray 131 can include a connection element 150 that can define a pivot axis Y substantially perpendicular to a support surface of the tray 131 about which the cup holder 140 can rotate. In one embodiment, the connection element 150 can be a formed as a post 152 having a generally cylindrical shape. A distal end portion of the arm 144 can include a cavity 154 through which the post 152 can be inserted to pivotally connect the arm 144 with the tray 131. A fastener element 151 (e.g., screw-washer assembly) can be engaged through the connection element 150 and the arm 144 to securely hold the arm 144 with the connection element 150. However, alternate embodiments may also use other constructions to securely hold the arm 144 including, without limitation, a built-in snap feature. In one embodiment, this hinge connection of the cup holder 140 can be disposed adjacent to one side segment 118A of the handle 118.

An outer surface of the connection element 150 can be provided with a first stop structure 152A and a second stop structure 152B spaced apart from each other. The cavity 154 can have a sidewall 156 provided with an interference element configured to engage with either of the first and second stop structures 152A and 152B. In one embodiment, the first and second stop structures 152A and 152B can be formed as arc-shaped recesses. Moreover, the interference element can be formed as an elastic detent 158 provided with a protrusion 160. The detent 158 can engage with either of the first and second strop structures 152A and 152B to hold the cup holder 140 in the first and second positions.

In FIG. 2, the cup holder 140 is shown in the first position retracted close to the tray 131. In the first position, the holder portion 142 is partially concealed and substantially stowed in a cavity 164 provided in an interior of the tray 131 and under an upper surface of the tray 131, which can block or limit access to the holder portion 142 for placement of a drink container. The detent 158 of the interference structure can engage with the first stop structure 152A to hold the cup holder 140 in the first position.

Figure 5:
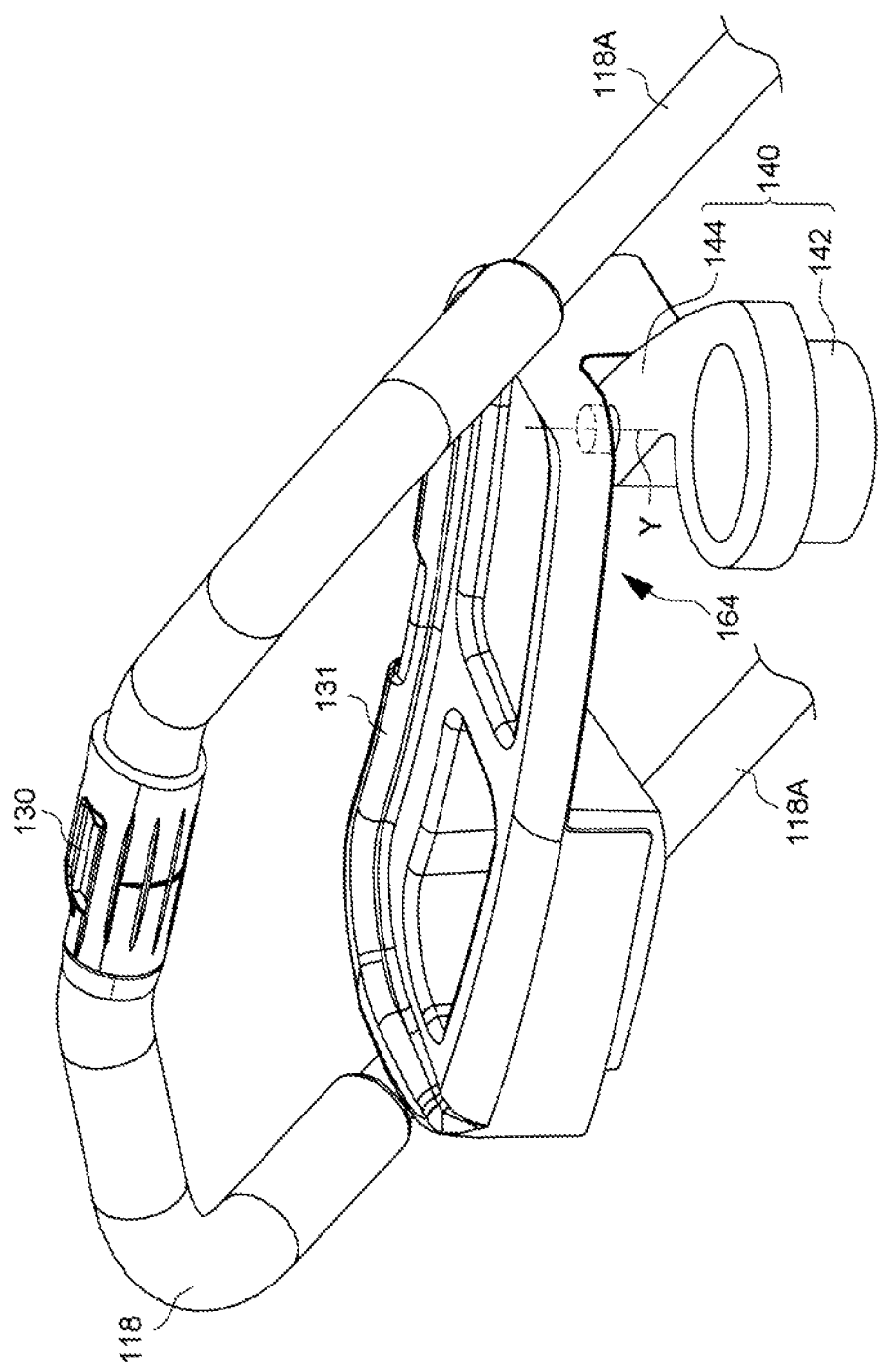
FIG. 5 is a schematic view illustrating the cup holder shown in FIG. 2 deployed to a second position.

FIG. 5 is a schematic view illustrating the cup holder 140 deployed to the second position. When the use of the cup holder 140 is required, the cup holder 140 can be rotated about the connection element 150 so that the holder portion 142 can deploy rearward outside the cavity 164. Once the cup holder 140 reaches the second position, the holder portion 142 can be displaced toward an outer side of the handle 118 (i.e., outside the area between the two side segments 118A of the handle 118) for facilitated access, and the detent 158 of the interference structure can engage with the second stop structure 152B to hold the cup holder 140 in place. Because the second position of the cup holder 140 can dispose the holder portion 142 farther away from the first seat 104, a drink supported by the cup holder 140 will less likely spill on a child installed on the first seat 104.

The ability to deploy and stow the cup holder 140 into the tray 131 can bring multiple advantages. For example, the outer appearance of the tray 131 can have a smooth and compact profile with improved aesthetics. Because the cup holder 140 is provided as a separate retractable element, more utilizable surface area of the tray 131 can also be available for placement of diverse objects. Moreover, the convenient stowage of the cup holder 140 within the outer envelop of the tray 131 can reduce the overall occupation volume, and may prevent the child from accidentally bumping the head against the cup holder 140 and accidental fall of small objects (such as mobile phones, MP3 players, rings, etc.) placed on the cup holder 140.

Figure 6:
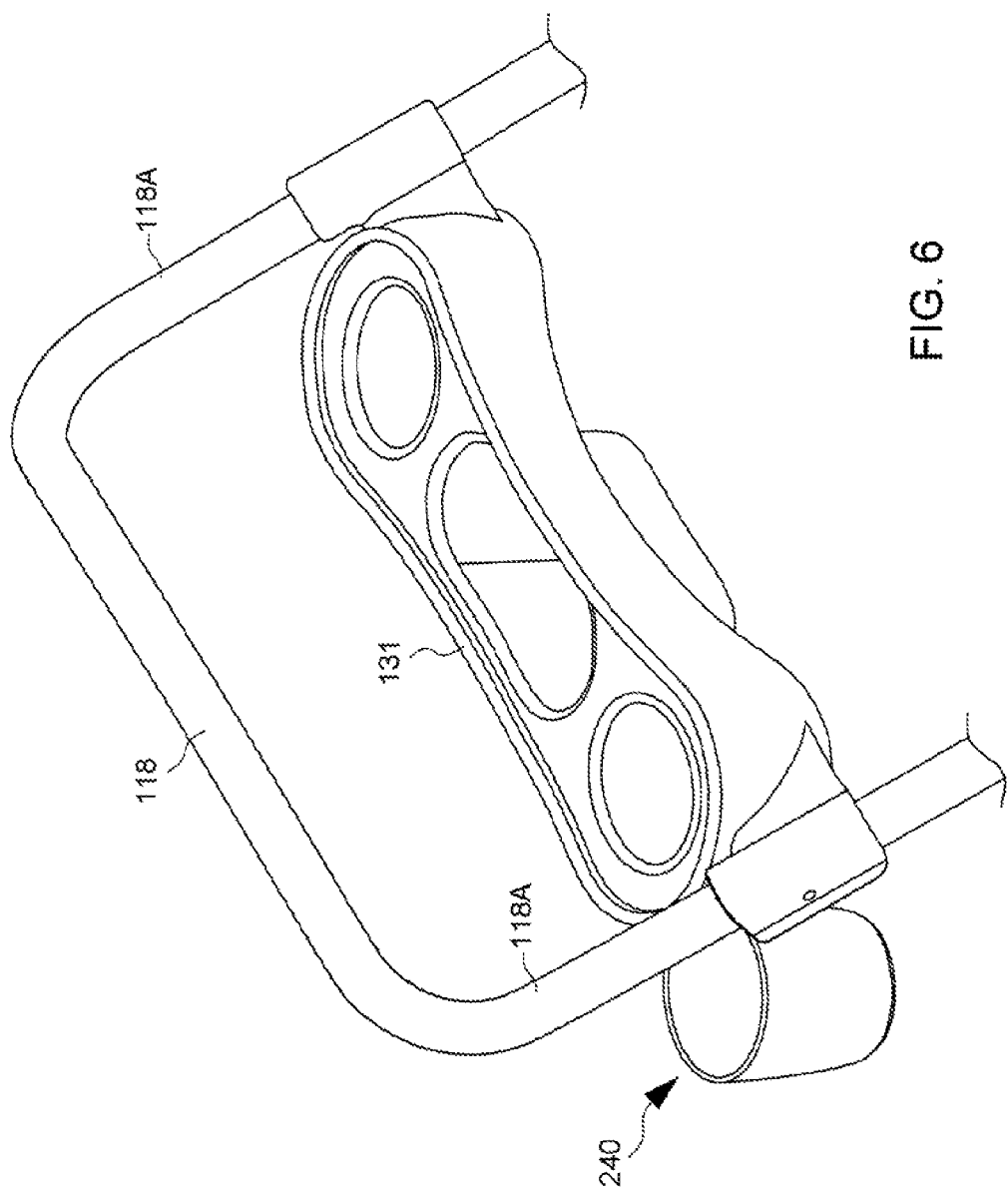
FIG. 6 is a perspective view illustrating the construction of another cup holder that may be assembled with the tray.
Figure 7:
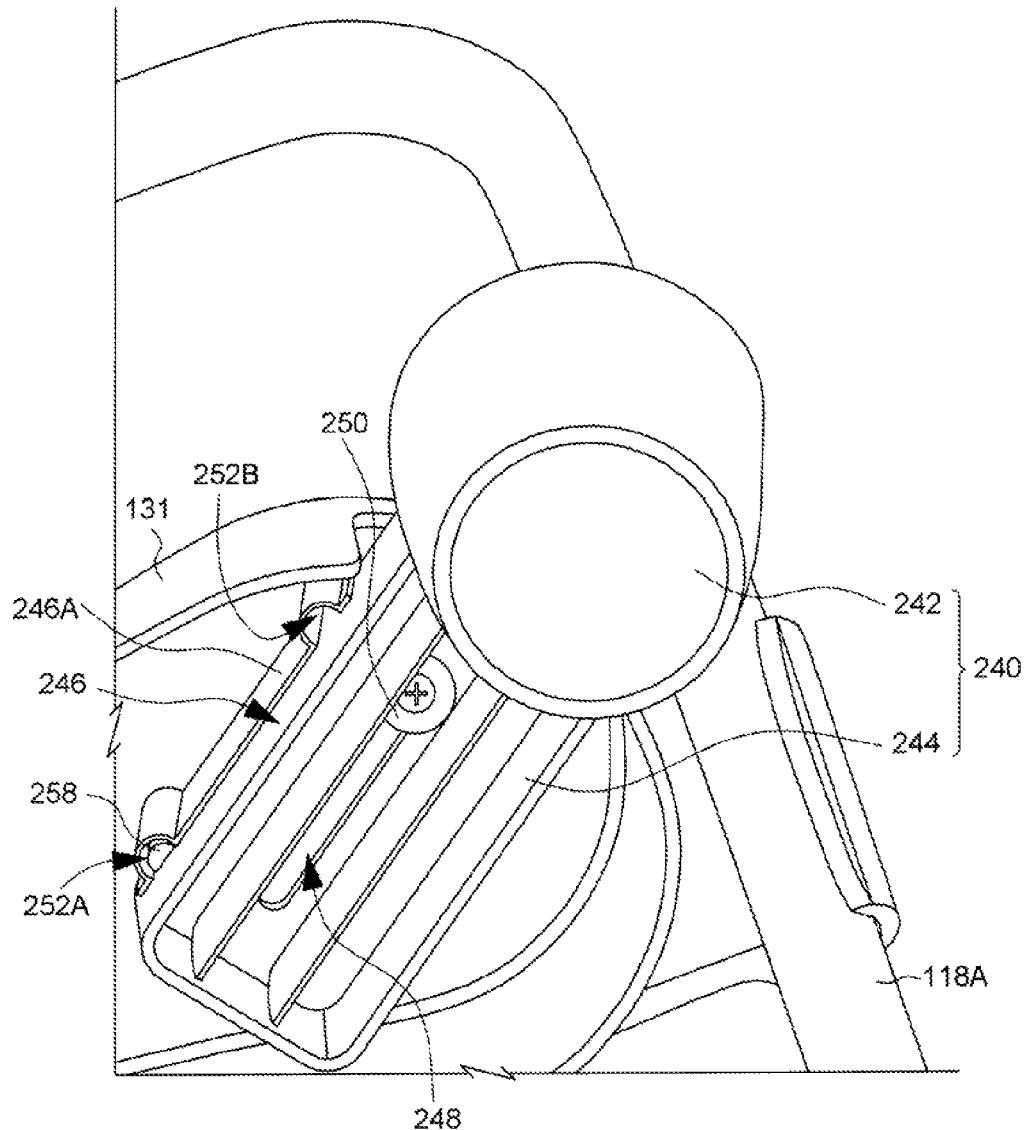
FIG. 7 is a schematic bottom view illustrating the assembly of the cup holder shown in FIG. 6 with the tray.

FIGS. 6 and 7 are schematic views illustrating the construction of another cup holder 240 that may be assembled with the tray 131. The cup holder 240 can include a holder portion 242, and an arm 244 joined with the holder portion 242 and movably assembled with the tray 131. The cup holder 240, including the holder portion 242 and the arm 244, may be formed integral by plastic injection molding. The holder portion 242 can be formed with a cup-like pocket sized to receive a drink container. The arm 244 can be joined with the holder portion 242 and slidably assembled with the tray 131. Different constructions may be applied to assemble the arm 244 with the tray 131.

In one embodiment, an underside of the tray 131 can form a guide slot 246 defined between two sidewalls 246A which extend from the tray 131. Moreover, the arm 244 can include an elongated slit 248 generally extending along the length of the arm 244. The arm 244 can be movably mounted in the guide slot 246, and the tray 131 can include a fixed connection element 250 (e.g., screw-washer assembly) that is mounted through the elongated slit 248. The arm 244 can thereby slide along the guide slot 246 to retract the holder portion 242 close to the tray 131, or to deploy the holder portion 242 at an outer side of the handle 118 for use.

Referring to FIG. 7, one or both of the sidewalls 246A can have an inner side provided with a first stop structure 252A and a second stop structure 252B spaced apart from each other. An outer edge surface of the arm 244 can have an interference element configured to engage with either of the first and second stop structures 252A and 252B. In one embodiment, the first and second stop structures 252A and 252B can be formed as arc-shaped recesses. Moreover, the interference element can be formed as an elastic protruding detent 258. The detent 258 can engage with either of the first and second strop structures 252A and 252B to hold the cup holder 140 in the first and second positions.

In FIGS. 6 and 7, the cup holder 240 is shown in the first position retracted close to the tray 131. In the first position, the holder portion 242 is placed adjacent to a side of the tray 131, and is located right behind the side segment 118A of the handle 118. While the holder portion 242 is visible, the inclination of the side segment 118A extending right above the holder portion 242 can block access to the holder portion 242 for placement of a drink container. The detent 258 of the interference structure can engage with the first stop structure 252A to hold the cup holder 242 in the first position.

Figure 8:
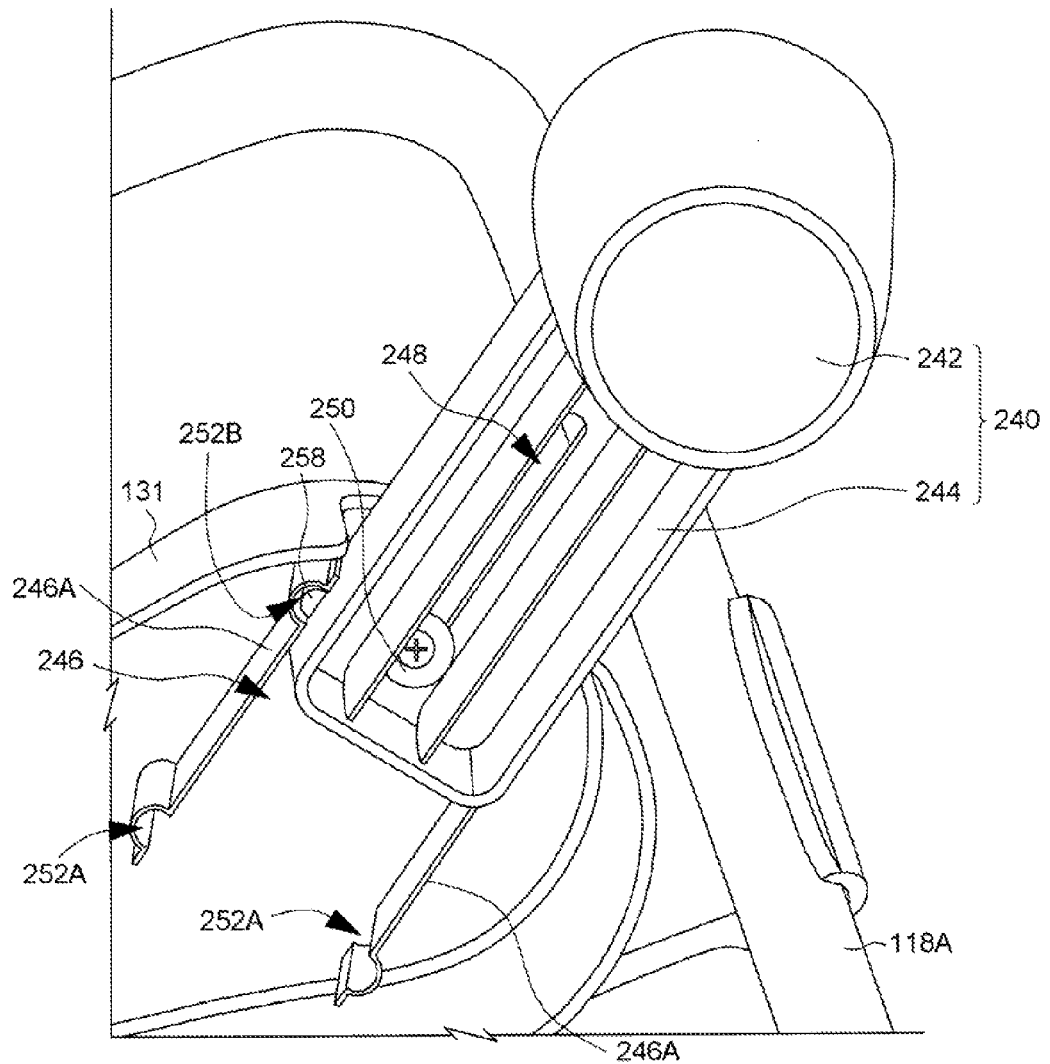
FIG. 8 is a schematic view illustrating the cup holder shown in FIG. 6 held in a second position deployed outward for use.

FIGS. 8 and 9 are schematic views illustrating the cup holder 240 deployed to the second position. When the use of the cup holder 240 is required, the cup holder 240 can be pulled so that the arm 244 slides along the elongated slot 248 in a direction that disengages the detent 258 from the first stop structure 252A. As the cup holder 240 is being pulled outward, the detent 258 can be in sliding contact against the sidewall 246A to facilitate a linear displacement of the arm 244. Once the holder portion 240 reaches the second position, the holder portion 242 can be arranged rearward and displaced toward an outer side of the handle 118 (i.e., outside the area between the side segments 118A) allowing the placement of a drink container, and the detent 258 can engage with the second stop structure 252B to hold the cup holder 240 in place. Because the second position of the cup holder 240 can arrange the holder portion 242 farther away from the first seat 104, a drink supported by the cup holder 240 will less likely spill on a child installed on the first seat 104.

At least one advantage of the structures described herein is the ability to provide an adjustable cup holder that can be retracted close to the tray and deployed at an outer side of the handle for use. Accordingly, accidental spillage from a drink supported by the cup holder onto a child seated in the stroller apparatus can be prevented. Moreover, some embodiments of the cup holder (i.e., cup holder 240) can form a drawer-like structure that can be at least partially enclosed when it is stowed in the interior of the tray to prevent accidental falls of small objects and make the stroller apparatus convenient to fold.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A tray assembly suitable for use with a stroller apparatus, comprising:
   a tray having an interior cavity that is substantially opened downward and is delimited upward by an upper wall of the tray, the tray including a connection element arranged at an underside of the upper wall; and
   an adjustable cup holder restrainedly held with the upper wall via a fastening element that fixedly engages with the upper wall, the cup holder including a holder portion, and an arm joined with the holder portion and pivotally connected with the tray about the connection element, the cup holder being operable to rotate relative to the tray between a first position retracted in the interior cavity, and a second position deployed substantially outside the interior cavity, the cup holder hanging from the upper wall in the first and second positions;
   wherein the connection element includes a post protruding downward from the upper wall and having a surface provided with a first stop structure and a second stop structure spaced apart from each other, and the arm includes a cavity through which the post is inserted, an end of the post terminating in the cavity, the cavity having a sidewall provided with an interference element configured to engage with either of the first and second stop structures to hold the cup holder in either of the first and second positions.

2. The tray assembly according to claim 1, wherein the holder portion is substantially stowed in an interior of the tray when the cup holder is in the first position.

3. A stroller apparatus comprising:
   a handle having two side segments;
   a tray assembled between the two side segments, the tray having an interior cavity that is substantially opened downward and is delimited upward by an upper wall of the tray, the tray including a connection element arranged at an underside of the upper wall; and
   a cup holder restrainedly held with the upper wall of the tray via a fastening assembly that prevents falling of the cup holder, the cup holder including a holder portion, and an arm joined with the holder portion and pivotally connected with the tray about the connection element, the cup holder being operable to rotate relative to the tray between a first position retracted in the interior cavity, and a second position deployed substantially outside the interior cavity, the cup holder hanging from the upper wall in the first and second positions;
   wherein the connection element includes a post protruding downward from the upper wall and having a surface provided with a first stop structure and a second stop structure spaced apart from each other, and the arm includes a cavity through which the post is inserted, an end of the post terminating in the cavity, the cavity having a sidewall provided with an interference element configured to engage with either of the first and second stop structures to hold the cup holder in either of the first and second positions.

4. The stroller apparatus according to claim 3, wherein the first and second stop structures include recesses, and the interference element includes a detent.

5. The stroller apparatus according to claim 3, wherein the holder portion is substantially stowed in an interior of the tray when the cup holder is in the first position.

6. The stroller apparatus according to claim 3, wherein one of the side segments extends at an inclined angle right above the holder portion to limit access to the holder portion when the cup holder is located in the first position.

7. The stroller apparatus according to claim 3, wherein the holder portion is located at an outer side of the handle when the cup holder is in the second position.

* * * * *